US012664079B2

(12) United States Patent
Zhou et al.

(10) Patent No.: US 12,664,079 B2
(45) Date of Patent: Jun. 23, 2026

(54) USING HIERARCHICAL MODELS AND ARTIFICIAL INTELLIGENCE (AI) TO IMPROVE RECOGNITION OF GRAPHICAL OBJECTS

(71) Applicant: MICRO FOCUS LLC, Austin, TX (US)

(72) Inventors: Gaoyang Zhou, Shanghai (CN); Jun Zhao, Shanghai (CN); ChengZhe Xu, Shanghai (CN)

(73) Assignee: Micro Focus LLC, Santa Clara, CA (US)

( * ) Notice: Subject to any disclaimer, the term of this patent is extended or adjusted under 35 U.S.C. 154(b) by 304 days.

(21) Appl. No.: 18/520,927

(22) Filed: Nov. 28, 2023

(65) Prior Publication Data

US 2025/0173251 A1      May 29, 2025

(51) Int. Cl.
G06F 11/3698      (2025.01)
G06V 30/413      (2022.01)
G06V 30/42      (2022.01)

(52) U.S. Cl.
CPC ........ G06F 11/3698 (2025.01); G06V 30/413 (2022.01); G06V 30/42 (2022.01)

(58) Field of Classification Search
CPC ............. G06F 11/3698; G06F 16/5854; G06V 30/413; G06V 30/42
See application file for complete search history.

(56) References Cited

U.S. PATENT DOCUMENTS

| | | | |
|---|---|---|---|
| 10,628,630 B1 * | 4/2020 | Surace ................... | H04L 67/02 |
| 11,138,022 B2 * | 10/2021 | Rohde ................... | G06F 16/248 |
| 2022/0050584 A1 * | 2/2022 | Dines ................... | G06V 10/235 |
| 2022/0261336 A1 * | 8/2022 | Luzon ................. | G06F 11/3698 |

OTHER PUBLICATIONS

Jerry Gao et al.; An Approach to GUI Test Scenario Generation Using Machine Learning; IEEE; pp. 79-86; retrieved on Dec. 5, 2025 (Year: 2022).*
Lee White et al.; Generating Test Cases for GUI Responsibilities Using Complete Interaction Sequences; IEEE; pp. 110-121, retrieved on Dec. 5, 2025 (Year: 2000).*

* cited by examiner

*Primary Examiner* — S. Sough
*Assistant Examiner* — Cuong V Luu
(74) *Attorney, Agent, or Firm* — Sheridan Ross P.C.

(57)      ABSTRACT
A first graphical object in a graphical user interface is identified using an Artificial Intelligence (AI) algorithm. The graphical user interface comprises a second graphical object that was not properly identified by the AI algorithm. Source code is retrieved from a hierarchical model of the graphical user interface. A determination is made if the identified first identified graphical object and the second graphical are the same type (e.g., a button object). In response to the identified first graphical object and the second graphical object being the same type, an attribute of the identified first graphical object is compared to an attribute of the second graphical object. In response to the attribute of the identified first graphical object being the same as the attribute of the second graphical object, the second graphical object as identified as the same graphical object type as the first graphical object.

19 Claims, 4 Drawing Sheets

USING HIERARCHICAL MODELS AND ARTIFICIAL INTELLIGENCE (AI) TO IMPROVE RECOGNITION OF GRAPHICAL OBJECTS

FIELD

The disclosure relates generally to identification of graphical objects and particularly to identification of graphical objects using hierarchical AI modes.

BACKGROUND

Traditional processes for recognizing graphical objects while useful, also have some limitations. For example, existing AI processes sometimes fail to recognize some graphical objects. This can cause problems when trying to test all the graphical objects. If some of the graphical objects are not properly identified, then only a portion of the graphical objects in the graphical user interface are tested. This results in not properly testing all the graphical objects in the application under test. This can result in lower quality and more bugs in a software application being tested.

SUMMARY

These and other needs are addressed by the various embodiments and configurations of the present disclosure. The present disclosure can provide a number of advantages depending on the particular configuration. These and other advantages will be apparent from the disclosure contained herein.

A first graphical object in a graphical user interface is identified using an Artificial Intelligence (AI) algorithm. The graphical user interface comprises a second graphical object that was not properly identified by the AI algorithm. Source code is retrieved from a hierarchical model of the graphical user interface. A determination is made if the identified first identified graphical object and the second graphical are the same first type (e.g., a button). In response to the identified first graphical object and the second graphical object being the same first type, an attribute of the identified first graphical object is compared to an attribute of the second graphical object (e.g., a font size and/or a font color). In response to the attribute of the identified first graphical object being the same as the attribute of the second graphical object, the second graphical object as identified as the same graphical object type as the first graphical object.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
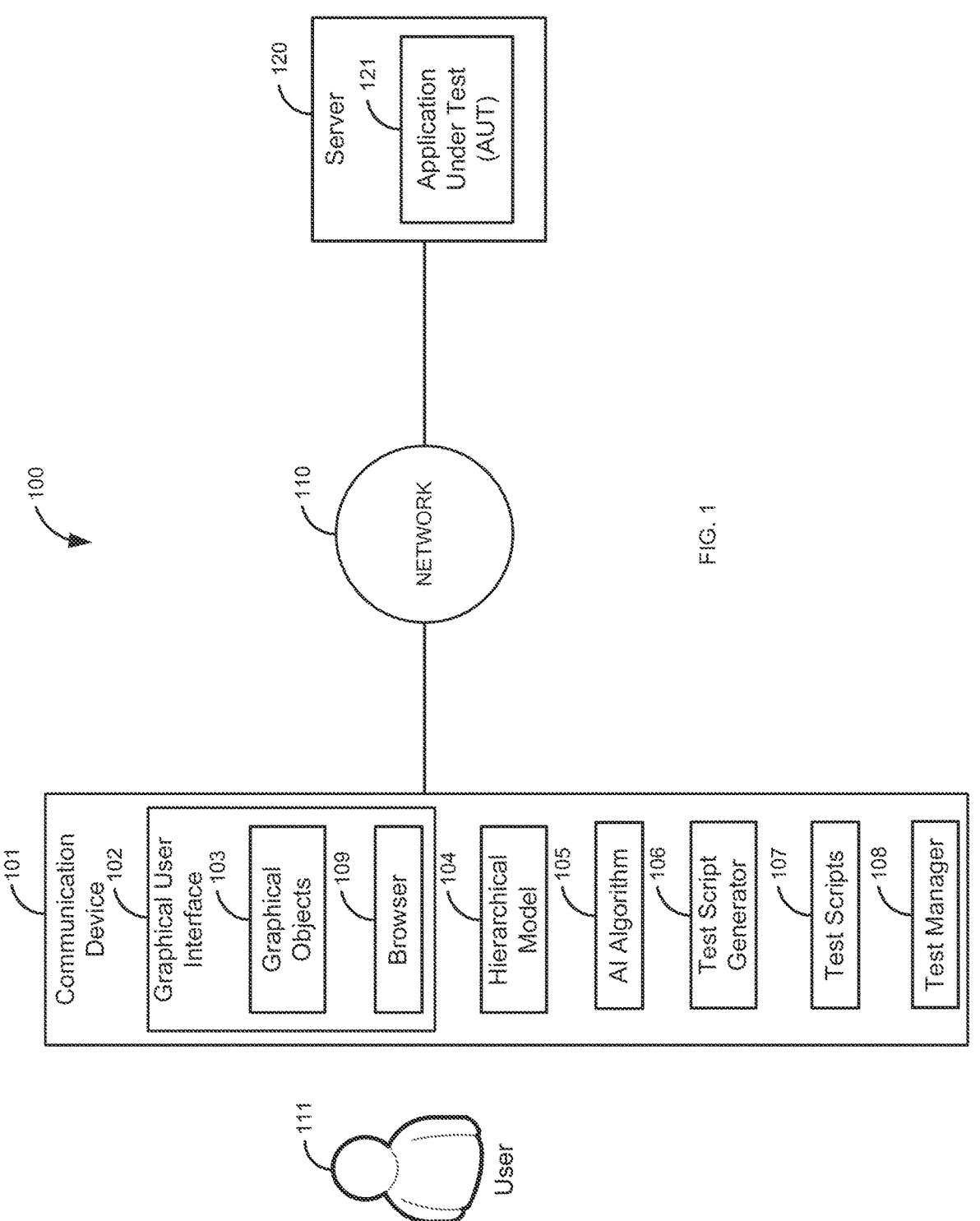
FIG. 1 is a block diagram of a first illustrative system for using a hierarchical models and Artificial Intelligence (AI) to improve recognition of graphical objects in a graphical user interface.

FIG. 1 is a block diagram of a first illustrative system 100 for using hierarchical models 104 and Artificial Intelligence (AI) to improve recognition of graphical objects 103 in a graphical user interface 102. The first illustrative system 100 comprises a communication device 101, a network 110, and a server 120. In addition, a user 111 is shown for convenience.

The communication device 101 can be or may include any device that can communicate on the network 110, such as a Personal Computer (PC), a tablet device, a laptop computer, a notebook device, a smartphone, a testing apparatus, and/or the like. Although only a single communication device 101 is shown, any number of communication devices 101 may be connected to the network 110 to test the server 120/Application Under Test (AUT) 121. The communication device 101 further comprises a graphical user interface 102, an AI algorithm 105, a test script generator 106, test scripts 107, and a test manager 108.

The graphical user interface 102 can be or may include any interface that can display the graphical objects 103 to the user 111, such as, a Light Emitting Diode (LED) display, a plasma display, a cathode ray tube, and/or the like. The graphical user interface 102 comprises the graphical objects 103 and a browser 109.

The graphical objects 103 can be or may include any graphical object 103 that can be displayed in the graphical user interface 102, such as a window, a text object, a text field, a text area, a button, a menu, a menu item, a scroll bar, a slider, a tab, an image, a panel, a hyperlink, a table, and/or the like. The graphical objects are generated from the hierarchical model 104. For example, the hierarchical model 104 may be from a web page that is provided by the application under test 121 to the browser 109. The graphical objects 103 from the hierarchical model 104 are then displayed in the graphical user interface 102.

The browser 109 may be any type of browser, such as Crome®, Firefox®, Safari®, Internet Explorer®, and/or the like. The browser 109 may be used to display the graphical objects 103 in the graphical user interface 102 by interpreting source code of the hierarchical model 104.

The hierarchical model 104 may be any type of hierarchical model. For example, the hierarchical model 104 may be a Document Object Model (DOM).

The AI algorithm 105 can be or may include any type of AI algorithm 105, such as a supervised machine learning algorithm, a semi-supervised machine learning algorithm, an unsupervised machine learning algorithm, a reinforcement machine learning algorithm, and/or the like. The AI algorithm 105 is used to identify different types of graphical objects 103 in the graphical user interface 102. The identification of the graphical objects 103 in the graphical user interface 102 is for generation of the test scripts 107 to test the graphical objects 103 of the application under test 121. The AI algorithm 105 may be trained using known graphical objects 103 so that new variations of different types of graphical objects 103 can be identified. The AI algorithm 105 may use captured images of the graphical user interface 102 to identify the graphical objects 103.

The test script generator 106 can be or may include any software/hardware that can generate the test scripts 107 based on identification of the graphical objects 103. The test script generator 106 may generate different test scripts 107 to exercise the graphical objects 103. For example, the test script generator 106 may generate test scripts 107 that produce a series of simulated mouse clicks to simulate the user 111 clicking on the different graphical objects 103 in the graphical user interface 102.

The test scripts 107 may be scripts that cover some or all of the different aspects of the application under test 121. For example, if the application under test 121 is a web application, the test scripts 107 may cover all or some of the web pages provided by the application under test 121.

The test manager 108 can be or may include any hardware coupled with software that can manage the generation/use/execution of the test scripts 107. The test manager 108 may manage the AI algorithm 105 to identify the graphical objects 103 in the graphical user interface 102.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Transfer Protocol (HTTP), Web Real-Time Protocol (Web RTC), and/or the like. Thus, the network 110 is an electronic communication network configured to carry messages via packets and/or circuit switched communications.

The server 120 can be or may include any hardware coupled with software that can host/manage the application under test 121. For example, the server 120 may be an application server, a web server, a database server, security server, and/or the like.

The application under test 121 may be any type of application that has graphical objects 103 that are displayed a graphical user interface 102, such as a web application, a security application, a financial application, an embedded application (e.g., a printer), a human resource application, a social media application, a shopping application, and/or the like. The application under test 121 may comprise multiple components/web pages.

Figure 2:
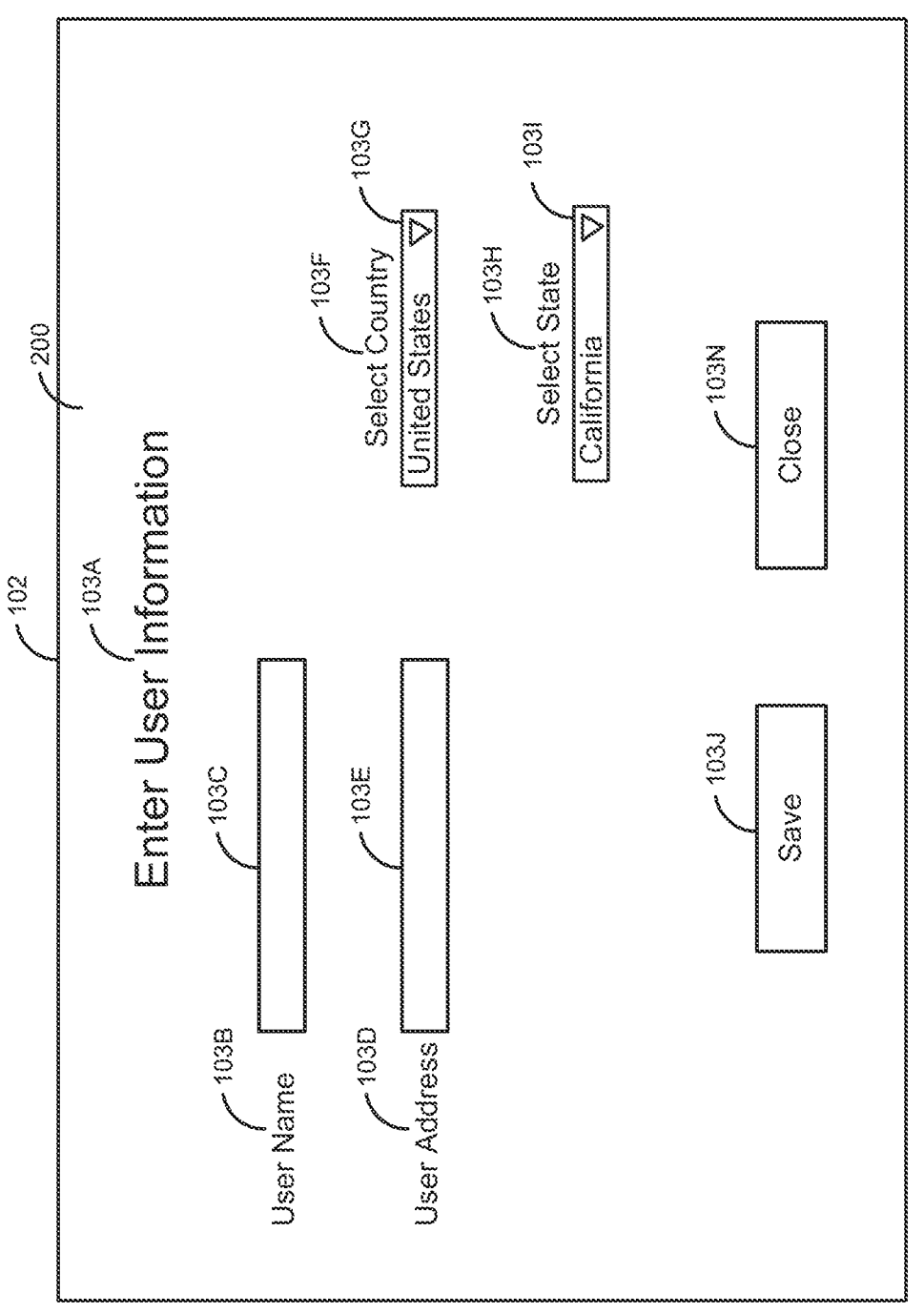
FIG. 2 is a diagram of a window in a graphical user interface.

FIG. 2 is a diagram of a window 200 in graphical user interface 102. The window 200 in the graphical user interface 102 comprises graphical objects 103A-103N. The graphical objects 103A, 103B, 103D, 103F, and 103H are text objects. The graphical objects 103C and 103E are text field objects. The graphical objects 103G and 103I are menu objects. The graphical objects 103J and 103N are button objects.

With current AI recognition techniques of images, the AI algorithm 105 may not always identify all the graphical objects 103A-103N when capturing an image of the user interface 102. For example, the AI algorithm 105 may identify the text objects 103A, 103B, 103D, and 103H while not identifying the text object 103F. Likewise, the AI algorithm 105 may identify the text field 103C and not the text field 103E. This may be due to various reasons, such as location, size, shape, shading, background around the graphical object 103, font size, font type, and/or the like.

Figure 3:
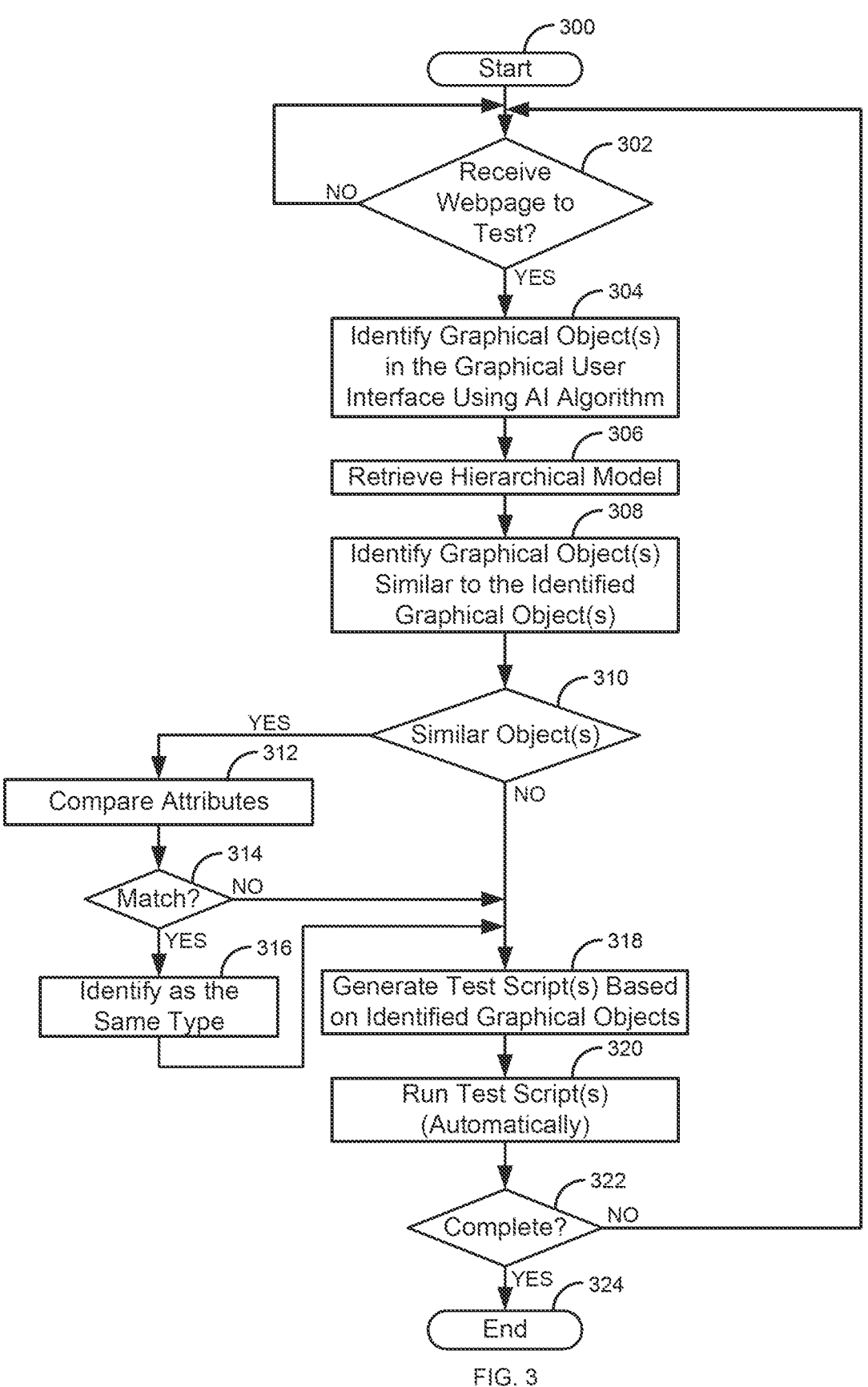
FIG. 3 is a flow diagram of a process for using hierarchical models and Artificial Intelligence (AI) to improve recognition of graphical objects.
Figure 4:
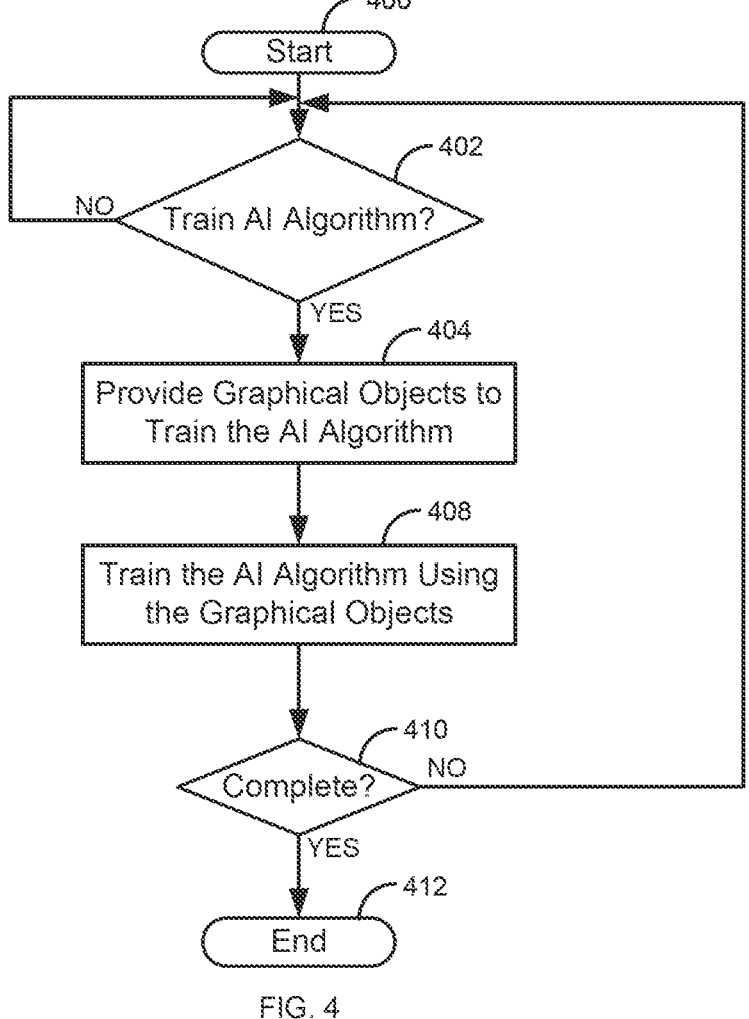
FIG. 4 is a flow diagram of a process for training an AI algorithm to identify graphical objects.

FIG. 3 is a flow diagram of a process for using hierarchical models 104 and Artificial Intelligence (AI) to improve recognition of graphical objects 103. Illustratively, the communication device 101, the graphical user interface 102, the graphical objects 103, the browser 109, the hierarchical model 104, the AI algorithm 105, the test script generator 106, the test scripts 107, the test manager 108, the server 120, and the application under test 121 are stored-program-controlled entities, such as a computer or microprocessor, which performs the method of FIGS. 3-4 and the processes described herein by executing program instructions stored in a computer readable storage medium, such as a memory (i.e., a computer memory, a hard disk, and/or the like). Although the methods described in FIGS. 3-4 are shown in a specific order, one of skill in the art would recognize that the steps in FIGS. 3-4 may be implemented in different orders and/or be implemented in a multi-threaded environment. Moreover, various steps may be omitted or added based on implementation.

The process starts in step 300. The test manager 108 determines, in step 302, whether a webpage to test has been received. If a webpage to test has not been received in step 302, the process of step 302 is repeated. While step 302 is described using a web page, the process of step 302 may be triggered based on other events or based on non web page user interfaces.

Otherwise, if a request to receive a webpage to test has been received, the test manager 108 identifies, in step 304, the graphical object(s) 103 in the graphical user interface 102 using the AI algorithm 105. For example, an image of the graphical user interface 102 is captured and analyzed by the AI algorithm 105. Below is an example of code that may be used to identify the graphical objects 103 in a captured image of the graphical interface 102.

```
#Generate and return controls as a collection
    def generate_controls(webpage_image, model):
    #Capture an image of the current webpage
    #Perform image recognition using the trained model
#Identify and return controls
    def identify_confidence_controls(controls, confi-
        dence_range):
    #Return controls with confidence to a collection
```

The test manager 108 retrieves the hierarchical model 104 in step 306. For example, the hierarchical model 104 may be a Document Object Model that is captured from one or more webpages. The hierarchical model 104 is created from the source code provided by the webpage. The hierarchical model 104 is used to identify similar graphical objects 103 to the ones identified by the AI algorithm 105 in step 304. An exemplary snippet of source code is shown below on how the hierarchical model 104 is created/used to identify the similar graphical objects 103 in the graphical user interface 102 that were not identified in step 304.

```
#Create a Hierarchical Model
def create_hierarchical_model(high_confidence_controls,
    webpage_image):
    hierarchical_model={ } #Initialize an empty hierarchi-
        cal model
    for control in high_confidence_controls:
        #Based on Attr&CSS, find similar controls, interface
            to Javascript code
        similar_controls=find_similar_controls(control,
            webpage_image)
        if similar_controls and similar_controls not in hier-
            archical_model:
        hierarchical_model[control]=similar_controls
    return hierarchical_model
#Return true if these two controls are the same
def is_hierarchical_control_equal_to_confidence_control
    (h_control, c_control):
    #Compare hierarchical_control and confidence_control
        to see if they are the same
```

The test manager 108 determines, in step 310, if there are similar graphical objects 103. If there are not any similar graphical objects 103 in step 310, the process goes to step 318.

Otherwise, if there are similar graphical objects 103 in step 310, the test manager 108 compares attributes of the graphical objects 103. For example, using FIG. 2, if the AI algorithm 105 identified the button 103J in step 304, but did not identify the button 103N, the test manager 108 compares attributes from the button 103J to the button 103N in step 312. The attributes may be one or more of a font size, a font style, a text color, a background color, a shading, and/or the like. The comparison may be based on a threshold or a number of matches of the attributes/approximate matches of attributes. For example, if the color, the font size, and the font type, are all the same, the graphical objects 103 would be deemed to be the same type. In one embodiment, a variance may be allowed for different font sizes or a range of font sizes. Alternatively, allowances for different colors, shadings, backgrounds, and/or the like may be used to identify similar graphical objects 103.

When discussing comparing attributes of graphical objects 103 herein and in the claims, when comparing attributes to be the same type, this can include not only graphical objects 102 being the same type (e.g., being the same font and font size), but also where the graphical objects 103 have similar attributes (within a font size range). For example, graphical objects 103 that are deemed similar based on a threshold of similarity.

If there is not a match/approximate match (e.g., based on rules) in step 314, the process goes to step 318. Otherwise, if there is a match in step 314, the graphical objects 103 are identified as the same type in step 316.

The test script generator 106 generates, in step 318, the test scripts 107 based on the identified graphical objects 103 being the same type. The generated test scripts 107 are for the objects identified in step 304 and/or step 316. The types of test scripts 107 generated may vary based on the type of graphical object 103. For example, if the identified graphical object 103 is a button, the test script 107 may be to click the button. If the identified graphical object 103 is a text field, the test script 107 may be to fill in the text field.

The test scripts 107 are then run in step 320. The test scripts 107 may be run automatically or may be run based on the user 111 starting the test scripts 107. The running of the test scripts 107 may be to run a portion of the test scripts 107.

While the process of step 308-316 are described using a single object, the process of steps 308-316 may work in parallel for multiple graphical objects 103. For example, if there two buttons identified similar objects in step 310, there may be a match in step 314 for a first one of the buttons and not a match in step 314 for the second button.

The test manager 108 determines, in step 322, if the process is complete. If the process is not complete in step 322, the process goes back to step 302. Otherwise, if the process is complete in step 322, the process ends in step 324.

FIG. 4 is a flow diagram of a process for training an AI algorithm 105 to identify graphical objects 103. The process starts in step 400. The test manager 108 determines, in step 402, whether to train the AI algorithm 105. If the AI algorithm 105 is not to be trained in step 402, the process of step 402 repeats.

Otherwise, if the AI algorithm 105 is to be trained in step 402, the test manager 108 provides different types of graphical objects 103 to train the AI algorithm 105 in step 404. For example, the training data for the AI algorithm 105 may contain different text objects, different button objects, different panel objects, different menu objects, different menu items, different images, different scroll bars, different sliders, and/or the like. The AI algorithm 105 is then trained based on the graphical objects 103 of the training set in step 408.

Below is an example of code that may be used to train the AI model 105.

```
# Add this control to the model as a positive example in the training
model
    def add_positive_example(control):
    # prepare for next training
    # This is an interface to C++ code about training AI algorithm
# Main program
if _name_ == "_main_":
    # Train the model
    # Because training consumes a lot of time and hardware resources,
training is not performed every time before recognition.
    # This is just to show the process. Most executions only require getting
the already trained machine learning model.
    trained_model = train_machine_learning_model( )
    # Identify high-confidence controls
    webpage_image = capture_webpage_image( )
    g_controls = generate_controls(webpage_image, trained_model)
    high_confidence_controls = identify_confidence_controls(g_controls,
high_confidence_range)
    # Create a hierarchical model
    hierarchical_model = create_hierarchical_model(high_confidence_
controls, webpage_image)
    # Identify controls with confidence in medium_confidence_range
    medium_confidence_controls = identify_confidence_controls(g_
controls, medium_confidence_range)
    # Add medium-confidence controls to the high-confidence collection
based on hierarchical_model
    for h_control in hierarchical_model:
        for c_control in medium_confidence_controls:
            if
is_hierarchical_control_equal_to_confidence_control(h_control, c_control) :
                high_confidence_controls.add(c_control)
                add_positive_example(c_control)
                # Returns the recognition data corrected according to
hierarchical_model
    return high_confidence_controls
# Train a machine learning model
    def train_machine_learning_model( ):
```

-continued

```
    # Collect and label image data
    # Train the model using image processing techniques and deep learning
algorithms
    # Return the trained model
    # This is an interface to C++ code about training AI algorithm
```

The test manager 108 determines, in step 410, if the process is complete. If the process is not complete in step 410, the process goes to step 402. Otherwise, the process ends in step 410.

Although not shown, the identified graphical objects 103 of step 316 may be captured and used to retrain the AI algorithm 105 as described in FIG. 4. For example, images of the identified graphical objects 103 of step 316 may be provided as new graphical objects 103 in the training data of step 404 to increase the accuracy of the AI algorithm 105 in detecting new graphical objects 103.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:

a microprocessor; and a computer readable medium, coupled with the microprocessor and comprising microprocessor readable and executable instructions that, when executed by the microprocessor, cause the microprocessor to:

identify, using an Artificial Intelligence (AI) algorithm, a first graphical object in a graphical user interface, wherein the graphical user interface comprises a second graphical object that was not properly identified by the AI algorithm;

retrieve source code from a hierarchical model of the graphical user interface;

determine, based on the source code, if the first graphical object are a second graphical are the same first type;

in response to the first graphical object and the second graphical object being the same first type, compare an attribute of the first graphical object to an attribute of the second graphical object;

in response to the attribute of the first graphical object being the same as the attribute of the second graphical object, identify the second graphical object as being the same graphical object type as the first graphical object; and in response to the identifying the second graphical object being the same graphical object type as the first graphical object, automatically generate and run a test script to exercise the second graphical object in the graphical user interface.

2. The system of claim 1, wherein the microprocessor readable and executable instructions further cause the microprocessor to:

identify, using the AI algorithm, a third graphical object in the graphical user interface, wherein the graphical user interface comprises a fourth graphical object that was not properly identified by the AI algorithm;

determine if the third graphical object and the fourth graphical object are being a same second type;

in response to the determining that the third graphical object and the fourth graphical object are the same second type, compare an attribute of the third graphical object to an attribute of the fourth graphical object; and in response to the attribute of the third graphical object being the same as the attribute of the fourth graphical object, identifying the fourth graphical object as being the same graphical object type as the third graphical object.

3. The system of claim 1, wherein the attribute of the first graphical object comprises at least one of: a font size, a font type, a color, a shade, and a background.

4. The system of claim 1, wherein the hierarchical model is a Document Object Model (DOM).

5. The system of claim 1, wherein the first graphical object is one of: a text object, a text field object, a button object, menu object, a menu item object, a hyperlink, a slider object, a scroll bar object, a table object, and a tab object.

6. The system of claim 1, wherein the test script is associated with the graphical object type of the first graphical object.

7. The system of claim 6, wherein the test script to exercise the second graphical object automatically runs in response to the identifying the second graphical object being the same graphical object type as the first graphical object.

8. The system of claim 1, wherein an image of the second graphical object is used to retrain the AI algorithm.

9. A method comprising:

identifying, by a microprocessor, using an Artificial Intelligence (AI) algorithm, a first graphical object in a graphical user interface, wherein the graphical user interface comprises a second graphical object that was not properly identified by the AI algorithm;

retrieving, by the microprocessor, source code from a hierarchical model of the graphical user interface;

determining, by the microprocessor, based on the source code, if the first graphical object and the second graphical object are a same first type;

in response to the first graphical object and the second graphical object being the same first type, comparing, by the microprocessor, an attribute of the first graphical object to an attribute of the second graphical object;

in response to the attribute of the first graphical object being the same as the attribute of the second graphical object, identifying, by the microprocessor, the second graphical object as being the same graphical object type as the first graphical object; and in response to the identifying the second graphical object as being the same graphical object type as the first graphical object, automatically generating and running a test script to exercise the second graphical object in the graphical user interface.

10. The method of claim 9, further comprising:

identifying, using the AI algorithm, a third graphical object in the graphical user interface, wherein the graphical user interface comprises a fourth graphical object that was not properly identified by the AI algorithm;

determining if the third graphical object and the fourth graphical object are a same second type;

in response to the determining that the third graphical object and the fourth graphical object are the same second type, comparing an attribute of the third graphical object to an attribute of the fourth graphical object; and in response to the attribute of the third graphical object being the same as the attribute of the fourth graphical object, identifying the fourth graphical object as being same graphical object type as the third graphical object.

11. The method of claim 9, wherein the attribute of the first graphical object comprises at least one of: a font size, a font type, a color, a shade, and a background.

12. The method of claim 9, wherein the hierarchical model is a Document Object Model (DOM).

13. The method of claim 9, wherein the first graphical object is one of: a text object, a text field object, a button object, menu object, a menu item object, a hyperlink, a slider object, a scroll bar object, a table object, and a tab object.

14. The method of claim 9, wherein the test script is associated with the graphical object type of the first graphical object.

15. The method of claim 9, wherein the second graphical object is used to retrain the AI algorithm.

16. A non-transitory computer readable medium having stored thereon instructions that cause a microprocessor to:

identify, using an Artificial Intelligence (AI) algorithm, a first graphical object in a graphical user interface, wherein the graphical user interface comprises a second graphical object that was not properly identified by the AI algorithm;

retrieve source code from a hierarchical model of the graphical user interface;

determine, based on the source code, if the first graphical object and the second graphical object are a same first type;

in response to the first graphical object and the second graphical object being the same first type, compare an attribute of the first graphical object to an attribute of the second graphical object;

in response to the attribute of the first graphical object being the same as the attribute of the second graphical object, identify the second graphical object as being the same graphical object type as the first graphical object; and in response to the identifying the second graphical object as being the same graphical object type as the first graphical object, automatically generate and run a test script to exercise the second graphical object in the graphical user interface.

17. The non-transitory computer readable medium of claim 16, wherein the instructions further cause the microprocessor to:

identify, using the AI algorithm, a third graphical object in the graphical user interface, wherein the graphical user interface comprises a fourth graphical object that was not properly identified by the AI algorithm;

determine if the third graphical object and the fourth graphical object are a same second object type;

in response to the determining that the third graphical object and the fourth graphical object are the same second object type, compare an attribute of the third graphical object to an attribute of the fourth graphical object; and in response to the attribute of the third graphical object being the same type as the attribute of the fourth graphical object, identify the fourth graphical object as being the same graphical object type as the third graphical object.

18. The non-transitory computer readable medium of claim 16, wherein the attribute of the first graphical object comprises at least one of: a font size, a font type, a color, a shade, and a background.

19. The non-transitory computer readable medium of claim 16, wherein the test script is associated with the graphical object type of the first graphical object.

* * * * *